(12) United States Patent
Hagiwara et al.

(10) Patent No.: US 6,181,138 B1
(45) Date of Patent: Jan. 30, 2001

(54) DIRECTIONAL RESISTIVITY MEASUREMENTS FOR AZIMUTHAL PROXIMITY DETECTION OF BED BOUNDARIES

(75) Inventors: Teruhiko Hagiwara, Houston; Haoshi Song, Sugarland, both of TX (US)

(73) Assignee: Halliburton Energy Services, Inc., Houston, TX (US)

( * ) Notice: Under 35 U.S.C. 154(b), the term of this patent shall be extended for 0 days.

(21) Appl. No.: 09/255,621

(22) Filed: Feb. 22, 1999

(51) Int. Cl.[7] .............................. G01V 3/30; G01V 3/38; E21B 47/026; E21B 49/00

(52) U.S. Cl. ........................ 324/338; 324/343; 175/50; 702/7

(58) Field of Search ................................... 324/338–343, 324/346; 73/152.02, 152.03; 175/40, 45, 50; 702/7

(56) References Cited

U.S. PATENT DOCUMENTS

| | | | |
|---|---|---|---|
| 2,997,645 | * 8/1961 | Huddleston, Jr. et al. | 324/339 |
| 3,014,177 | * 12/1961 | Hungerford et al. | 324/339 X |
| 3,539,911 | * 11/1970 | Youmans et al. | 324/343 |
| 3,808,520 | * 4/1974 | Runge | 324/343 |
| 3,823,787 | 7/1974 | Haworth et al. | 175/24 |
| 4,445,578 | 5/1984 | Millheim | 175/45 |
| 4,712,070 | 12/1987 | Clark et al. | 324/338 |
| 4,786,874 | 11/1988 | Grosso et al. | 324/369 |
| 4,972,150 | * 11/1990 | Tabbagh | 324/343 X |
| 4,980,643 | * 12/1990 | Gianzero et al. | 324/343 X |
| 5,045,795 | 9/1991 | Gianzero et al. | 324/342 |
| 5,230,386 | 7/1993 | Wu et al. | 175/45 |
| 5,318,138 | 6/1994 | Dewey et al. | 175/74 |
| 5,508,616 | 4/1996 | Sato et al. | 324/343 |
| 5,530,358 | 6/1996 | Wisler et al. | 324/338 |

(List continued on next page.)

OTHER PUBLICATIONS

*Horizontal Drilling is Becoming Commonplace: Here's How It's DOne*, Jean–Francois Glannesini, World Oil, Mar. 1989.

*Engineering Drilling/Production*, Jeff Littleton, Offshore, Nov. 1988, p. 17.

*Sonic While Drilling—Real–Time Data To Guide Real–Time Decisions*, Schlumberger Oilfield Services Advertisement Undated.

*Measurements at the Bit: A New Generation of MWD Tools*, Author Unknown, Oilfield Review Apr./Jul. 1993; pp. 44–54.

Primary Examiner—Gerard Strecker
(74) *Attorney, Agent, or Firm*—Conley, Rose & Tayon, P.C.

(57) ABSTRACT

An azimuthally tunable resistivity measurement tool is provided. In one embodiment, the tool comprises a set of three skewed receiver antennas and a transmitter antenna. The three skewed receiver antennas are oriented in equally-spaced azimuthal directions to give them preferential sensitivity in those directions. The transmitter antenna transmits a radio-frequency signal that propagates through the formation surrounding a borehole. The signals from the three receiver antennas can be measured and combined to synthesize the signal that would be received by a virtual antenna oriented in any desired direction. Accordingly, virtual receivers oriented perpendicular to the tool axis and with variable azimuthal orientations can be synthesized. The orientation of such a virtual receiver that has a maximized receive signal amplitude can be used to identify the direction of a nearby bed boundary, and the maximized amplitude can be used to estimate the distance to the boundary. In another embodiment, the tool comprises a set of three skewed transmitter antennas and a receiver antenna. The signal responses of the receiver antenna to each of the transmitter antennas can be measured and combined to synthesize a signal response to a virtual transmitter antenna oriented in any desired direction. In yet another embodiment, the tool comprises a set of skewed transmitter antennas and a set of skewed receiver antennas. The skewed transmitter and receiver antennas work cooperatively to establish virtual transmitter/receiver pairs oriented in any desired azimuthal directions.

35 Claims, 12 Drawing Sheets

U.S. PATENT DOCUMENTS

| | | | |
|---|---|---|---|
| 5,654,639 | 8/1997 | Locatelli et al. | 324/339 |
| 5,678,643 | 10/1997 | Robbins et al. | 175/45 |
| 5,757,191 * | 5/1998 | Gianzero | 324/343 X |
| 5,892,460 | 4/1999 | Jerabek et al. | 340/856.4 |

* cited by examiner

DIRECTIONAL RESISTIVITY MEASUREMENTS FOR AZIMUTHAL PROXIMITY DETECTION OF BED BOUNDARIES

TECHNICAL FIELD OF THE INVENTION

The present invention relates generally to a bottomhole drilling assembly that includes a logging while drilling ("LWD") sub-system for determining characteristics of the borehole and formation during the drilling of a well. More particularly, the present invention relates to a resistivity logging tool for measuring formation resistivity parameters during drilling. Still more particularly, the present invention comprises an azimuthally tunable resistivity tool to facilitate navigation relative to a bed boundary during drilling.

BACKGROUND OF THE INVENTION

The gathering of downhole information has been done by the oil well industry for many years. Modern petroleum drilling and production operations demand a great quantity of information relating to the parameters and conditions downhole. Such information typically includes the location and orientation of the wellbore and drilling assembly, earth formation properties, and drilling environment parameters downhole. The collection of information relating to formation properties and conditions downhole is commonly referred to as "logging", and can be performed by several methods.

In conventional wireline logging, a probe or "sonde" having various sensors is lowered into the borehole after some or all of the well has been drilled. The sonde is typically constructed as a hermetically sealed steel cylinder for housing the sensors, and is typically suspended from the end of a long cable or "wireline". The wireline mechanically suspends the sonde and also provides electrical conductors between the sensors (and associated instrumentation within the sonde) and electrical equipment located at the surface of the well. Normally, the cable transports power and control signals to the sonde, and transports information signals from the sonde to the surface. In accordance with conventional techniques, various parameters of the earth's formations adjacent the borehole are measured and correlated with the position of the sonde in the borehole as the sonde is pulled uphole.

The sensors used in a wireline sonde may include a source device for transmitting energy into the formation, and one or more receivers for detecting the energy reflected from the formation. Various sensors have been used to determine particular characteristics of the formation, including nuclear sensors, acoustic sensors, and electrical sensors.

For an underground formation to contain petroleum, and for the formation to permit the petroleum to flow through it, the rock comprising the formation must have certain well known physical characteristics. For example, one characteristic is that the rock in the formation have space to store petroleum. If the rock in a formation has openings, voids, and spaces in which oil and gas may be stored, it is characterized as "porous". Thus, by determining if the rock is porous, one skilled in the art can determine whether or not the formation has the requisite physical properties to store and yield petroleum. Various wireline sensors may be used to measure formation porosity. Examples include the acoustic sensors described in U.S. Pat. Nos. 3,237,153, 3,312,934, 3,593,255, 4,649,525, 4,718,046, 4,869,349, and 5,069,308.

While wireline logging is useful in assimilating information relating to formations downhole, it nonetheless has certain disadvantages. For example, before the wireline logging tool can be run in the wellbore, the drillstring and bottomhole assembly must first be removed or "tripped" from the borehole, resulting in considerable expense and a loss of drilling time for the driller (who typically is paying daily fees for the rental of drilling equipment). In addition, because wireline tools are unable to collect data during the actual drilling operation, drillers must at times make decisions (such as the direction to drill, etc.) based on limited and possibly insufficient information, or else incur the costs of tripping the drillstring to run a wireline logging tool. Another disadvantage is that because wireline logging occurs a relatively long period after the wellbore is drilled, the accuracy of the wireline measurement can be questionable. As one skilled in the art will understand, the wellbore conditions tend to degrade as drilling muds invade the formation in the vicinity of the wellbore. In addition, the borehole shape may begin to degrade, reducing the accuracy of the measurements.

Because of these limitations associated with wireline logging, there recently has been an increased emphasis on the collection of data during the drilling process itself By collecting and processing data during the drilling process, the necessity of tripping the drilling assembly to insert a wireline logging tool can be eliminated, and the driller can make accurate "real-time" modifications or corrections as needed to optimize drilling performance. For example, the driller may change the weight-on-bit to cause the bottomhole assembly to tend to drill in a particular direction, or, if a steerable bottomhole assembly is used, the driller may operate in the sliding mode to effect source corrections. Moreover, the measurement of formation parameters during drilling, and hopefully before invasion of the formation, increases the usefulness of the measured data. Further, making formation and borehole measurements during drilling can save the additional rig time which otherwise would be required to run a wireline logging tool.

Designs for measuring conditions downhole along with the movement and location of the drilling assembly, contemporaneously with the drilling of the well, have come to be known as "measurement-while drilling" techniques, or "MWD". Similar techniques, concentrating more on the measurement of formation parameters, have commonly been referred to as "logging while drilling" techniques, or "LWD". While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The measurement of formation properties during drilling of the well by LWD systems improves the timeliness of measurement data and, consequently, increases the efficiency of drilling operations. Typically, LWD measurements are used to provide information regarding the particular formation in which the borehole is traversing. During the last several years, many in the industry have noted the desirability of an LWD system that could be especially used to detect bed boundaries in a real-time fashion to enable the driller to make directional corrections to stay in the pay zone. Alternatively, the LWD system could be used as part of a "Smart" system to automatically maintain the drill bit in the pay zone. See, e.g. commonly assigned U.S. Pat. No. 5,332,048, the teachings of which are incorporated by reference herein. The assignee has also developed a system which permits the measurement of LWD data at the drill bit to provide an earlier indication of bed boundaries and formation characteristics. See U.S. Pat. No. 5,160,925. The use of an LWD system with these other systems makes it possible to conduct at least certain portions of the drilling process automatically.

Ordinarily, a well is drilled vertically for at least a portion of its depth. The layers or strata that make up the earth's crust are generally substantially horizontal. Therefore, during vertical drilling, the well is substantially perpendicular to the geological formations through which it passes. One of the properties of the formation that is commonly logged is its resistivity. LWD tools that are designed to measure the resistivity of the surrounding formation need not be azimuthally focused, as the formation in question surrounds the wellbore and is essentially the same in all directions. Thus the rotation of the LWD tool with the bit has no significant effect on the measured resistivity. For this reason, typical LWD resistivity tools that are adapted for use in vertical wells are azimuthally symmetric and have no azimuthal sensitivity.

In certain applications, however, such as when drilling through formations in which the reservoir boundaries extend vertically, or when drilling from an off-shore platform, it is desirable to drill wells at less of an angle with respect to bed boundaries in the strata. This is often termed "horizontal" drilling. When drilling horizontally, it is desirable to maintain the well bore in the pay zone (the formation which contains hydrocarbons) as much as possible so as to maximize the recovery. This can be difficult since formations may dip or divert. Thus, while attempting to drill and maintain the well bore within a particular formation, the drill bit may approach a bed boundary. As the rotating bit approaches the bed boundary, the bed boundary will be on one side of the bit axis, i.e. in one azimuthal range with respect to the bit axis.

If a near-bit resistivity tool were capable of sensing resistivity values azimuthally, the sensed values could be analyzed to discern the direction of the bed boundary. If the tool were sufficiently sensitive, the approaching bed boundary would be detected in sufficient time to allow the driller to make corrections in accordance with known techniques to avoid exiting the desired formation. Hence, it is desirable to provide an LWD tool that allows azimuthally sensitive resistivity measurements, a tool that is easy to manufacture and assemble and that is sufficiently durable and reliable in the drilling environment.

SUMMARY OF THE INVENTION

Accordingly, there is provided herein an azimuthally tunable resistivity measurement tool. In one embodiment, the tool comprises a set of three skewed receiver antennas and a transmitter antenna. The three skewed receiver antennas are oriented in equally spaced azimuthal directions to give them preferential sensitivity in those directions. The transmitter antenna transmits a radio-frequency signal that propagates through the formation surrounding a borehole. The signals from the three receiver antennas can be measured and combined to synthesize the signal that would be received by a virtual antenna oriented in any desired direction. Accordingly, virtual receivers oriented perpendicular to the tool axis and with variable azimuthal orientations can be synthesized. The orientation of such a virtual receiver that has a maximized receive signal amplitude can be used to identify the direction of a nearby bed boundary, and the maximized amplitude can be used to estimate the distance to the boundary.

In another embodiment, the tool comprises a set of three skewed transmitter antennas and a receiver antenna. The three skewed transmitter antennas are oriented in equally spaced azimuthal directions to give them preferential gain in those directions. The signals received by the receiver antenna in response to a signal from each of the transmitter antennas can be measured and combined to synthesize a signal received by the receiver antenna in response to a signal from a virtual transmitter antenna oriented in any desired direction. Accordingly, virtual transmitters oriented perpendicular to the tool axis with variable azimuthal orientations can be synthesized. The orientation of such a virtual antenna that creates a maximized response signal can be used to identify the direction of a nearby bed boundary, and the maximized amplitude can be used to estimate the distance to the boundary.

In yet another embodiment, the tool comprises a set of skewed transmitter antennas and a set of skewed receiver antennas. The skewed transmitter and receiver antennas work cooperatively to establish virtual transmitter/receiver pairs oriented in any desired azimuthal directions. This invention further contemplates a method for making azimuthally sensitive resistivity measurements and a method for detecting the location of a bed boundary relative to a borehole.

BRIEF DESCRIPTION OF THE DRAWINGS

For an introduction to the detailed description of the preferred embodiments of the invention, reference will now be made to the accompanying drawings, wherein.

During the course of the following description, the terms "above" and "below" are used to denote the relative position of certain components with respect to the direction of flow of the incoming drilling mud. Thus, where a term is described as above another, it is intended to mean that drilling mud flows first through the first component before flowing through the second component. Thus, these and other terms are used to identify the relative position of components in the bottomhole assembly (or BHA), with respect to the distance to the surface of the well, measured along the wellbore path.

DETAILED DESCRIPTION OF THE PREFERRED EMBODIMENT

Figure 1:
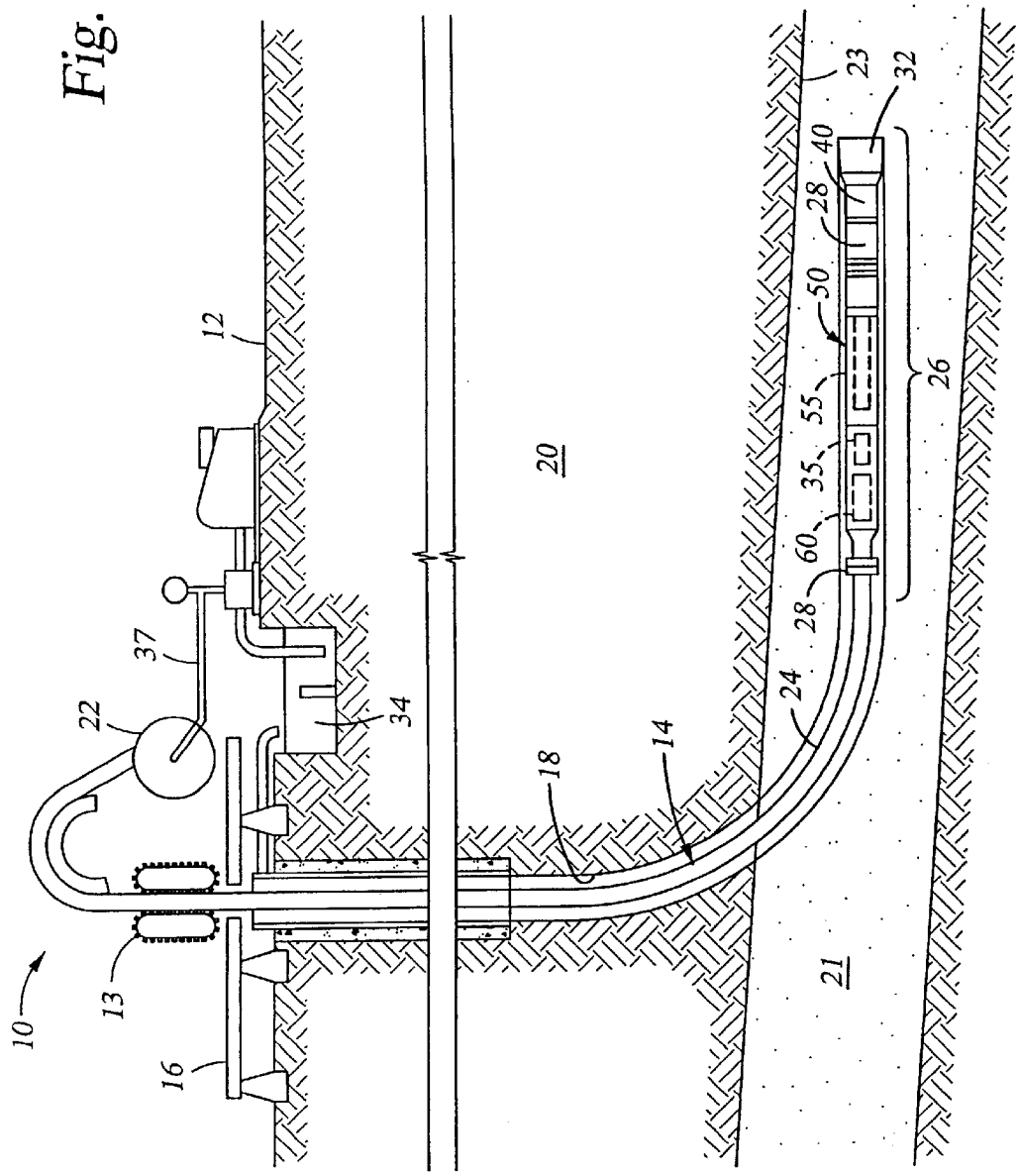
FIG. 1 is a schematic view of a deviated well and drill string incorporating an LWD tool.

Referring now to FIG. 1, a drilling installation is shown. A drilling rig 10 at the surface 12 of the well supports a drill string 14. The drill string 14 penetrates through a work platform 16 and into a borehole 18 that is drilled through earth formations 20 and 21. The drill string 14 may comprise coil tubing 24 from a spool 22 at its upper end, and a bottom hole assembly 26 (commonly referred to as a "BHA") coupled to the lower end of the coil tubing 24. The BHA 26 may include a drill bit 32, a downhole motor 40, one or more drill collars 28, an azimuthally tunable resistivity tool 50 mounted on collar section 55 as described in detail below, LWD sensors positioned in a collar section 55, directional MWD sensors located in a non-magnetic section 60, and one or more stabilizer(s) (not shown) for penetrating through earth formations to create the borehole 18. The drill collars 28, which also may be non-magnetic so as not to interfere with the MWD measurements, are used in accordance with conventional techniques to add weight to the drill bit 32 and to stiffen the BHA 26, thereby enabling the BHA 26 to transmit weight to the drill bit 32 without buckling. The weight applied through the drill collars 28 to the bit 32 permits the drill bit to penetrate underground formations.

The coil tubing 24 is forced into the borehole 18 by a tubing injector 13. Tubing injector 13 typically consists of an opposed pair of endless chains configured to grip the tubing. The chains may be driven in either direction to inject or withdraw the tubing from the borehole.

As the drill bit 32 operates, drilling fluid or mud is pumped from a mud pit 34 at the surface through the hose 37, into the tubing 24, and to the drill bit 32. After flowing through the drill bit 32, the drilling mud rises back to the surface through the annular area between the tubing 24 and the borehole 18, where it is collected and returned to the mud pit 34 for filtering. The drilling mud is used to lubricate and cool the drill bit 32 and to remove cuttings from the borehole 18. The drilling mud may also perform a number of other functions, which could include providing operating power to the downhole motor or other components downhole. As one skilled in the art will realize, the downhole motor or turbine 40 may be used downhole to rotate the drill bit 32.

As shown in FIG. 1, BHA 26 is defined as all of the downhole components from the top of the drill collars 28, down to the drill bit 32, including downhole motor 40. In the preferred embodiment, the BHA 26 preferably includes a measurement while drilling system, referred to herein as an "MWD system".

As is known in the art, an MWD system 60 typically includes directional MWD sensors and drilling parameter sensors such as weight-on-bit (WOB), torque-on-bit (TOB), shock, vibration, etc. In the preferred embodiment, directional sensors are provided in the BHA 26 to indicate the inclination angle, the horizontal angle, and the rotational angle (a.k.a. "tool face angle") of the BHA 26. As is commonly defined in the art, the inclination angle is the deviation from vertically downward, the horizontal angle is the angle in a horizontal plane from true North, and the tool face angle is the orientation (rotational about the tool axis) angle from the high side of the wellbore. In accordance with known techniques, wellbore directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the BHA can be determined. Additionally, a three axis magnetometer measures the earth's magnetic field vector in a similar manner. From the combined magnetometer and accelerometer data, the horizontal angle of the BHA may be determined.

The LWD tool 50 preferably is located close to the drill bit 32 to facilitate the ability to examine the formation as close to the bit as possible. As one skilled in the art will understand, the LWD tool 50 could also be located further up the BHA 26 from the drill bit 32 without departing from the principles of the present invention. Moreover, the LWD tool 50 may in actuality comprise multiple collar sections for housing various LWD sensors. The LWD formation sensors preferably include the present azimuthally tunable resistivity sensor, as well as gamma, sonic, density and neutron sensors in accordance with normal industry practice. See generally "State of the Art in MWD", International MWD Society (Jan. 19, 1993). A battery pack or other power source may be included in the LWD tool 50, or alternatively may be positioned in any convenient location to provide power to the various electrical assemblies in the BHA.

Still referring to FIG. 1, downhole data signaling unit 35 is preferably provided as part of BHA 26 and is used to transmit sensed values to a surface receiver via a mud pulse acoustic signal. The drilling mud serves as a communication medium between the controller and components at the surface of the well. By altering the flow of the drilling mud through the interior of the drillstring, pressure pulses may be generated, in the form of acoustic signals, in the column of drilling mud. By selectively varying the pressure pulses through the use of a mud pulser in the mud signaling unit 35, encoded binary pressure pulse signals can be generated to carry information indicative of downhole parameters to the surface for immediate analysis. In addition, the downhole system may also include the capability of receiving mud pulse signals from the surface to control the operation or activation of certain MWD sensors or other downhole components. The signaling unit 35 in the preferred embodiment comprises a mud pulser unit housed in a non-magnetic sub in accordance with conventional industry practice.

A downhole controller (not shown) preferably controls the operation of a signaling unit 35 and orchestrates the operation of the MWD and LWD sensors and other BHA components. The controller may be located in sub 60 or elsewhere in the BHA 26. In accordance with industry practice, the downhole controller may include appropriate data encoding circuitry, such as an encoder, which produces digitally encoded electrical data signals representative of the measurements obtained by the formation sensors and directional sensors. In addition, the controller processes the data received from the sensors and produces encoded signals indicative of a portion or all of the received signals for transmission to the surface via a mud pulse signal. The controller also may make decisions based upon the processed data.

The stabilizer preferably includes adjustable blades in accordance with the disclosure in commonly assigned U.S. Pat. Nos. 5,318,137 and 5,318,138, the teachings of which are incorporated by reference herein. As disclosed in these inventions, the inclination of the bottomhole assembly can be changed by selectively varying the extension of the stabilizer blades. As one skilled in the art will immediately recognize, the course of the BHA 26 also can be changed in accordance with other techniques, such as by selectively turning on or off a downhole motor, adjusting the angle of bend in a bent motor housing, or changing the weight on bit of the system. Use of such an adjustable component downhole in conjunction with an LWD system as disclosed herein makes it possible to design a "Smart System" for drilling certain portions of the wellbore automatically.

In many cases, the lower end of the borehole is deviated substantially from vertical, as shown in FIG. 1, so as to extend the length of its passage through an oil-bearing formation such as 21. Thus, it is desirable to provide a tool capable of detecting and locating bed boundaries such as 23. Although in FIG. 1 BHA 26 is deviated approximately 90 degrees from vertical, it will be understood that the present invention can be used to advantage in any similar situation wherein it is desired to locate a bed boundary 23 that is located to one side, rather than ahead, of collar section 55.

The various "beds" 20, 21 in the earth have characteristic resistivities which can be used to identify their position. For example, in a so-called "shaley-sand" formation, a shale bed may be characterized by a low resistivity of about 1 $\Omega \cdot m$. A bed of oil-saturated sandstone, on the other hand, may be characterized by a higher resistivity of about 10 $\Omega \cdot m$ or more. The sudden change in resistivity at the boundary between beds of shale and sandstone can be used to locate these boundaries. In horizontal drilling, the drill bit preferably can then be steered to avoid this boundary and keep the wellbore inside the oil-producing bed.

Two types of drill pipe 24 are popular: threaded tubing, and coiled tubing. Threaded tubing consists of lengths of pipe with threaded ends which allow the threaded tubing to be coupled together to form the drill string 14. Coiled tubing is a long, continuous pipe which is unwound from a spool as it is fed into the well. Each type has advantages and disadvantages, but one of the disadvantages of coiled tubing, at least from a logging standpoint, is that coiled tubing is not rotated during drilling operations. A logging sensor with azimuthal sensitivity would preferably have an azimuthally "steer-able" sensitivity. With threaded tubing, this issue can be resolved by the rotation of the drill string. Other means are needed for coiled tubing.

A variety of tool types are used for measuring resistivity. Induction tools are one type of resistivity tool generally known in the art. An induction tool comprises a pair of antenna coils, one of which transmits while the other receives. Induction tools measure the resistivity of the formation by measuring the current induced in the receiving antenna as a result of magnetic flux caused by current in the emitting antenna. Specifically, an alternating current with a known intensity is fed to the emitting coil or antenna. Current flow through the emitting coil induces currents in the formation that flow in coaxial loops around the tool. These currents in turn induce a signal in the receiving coil. This signal induced in the receiving coil can be measured and is generally proportional to the conductivity of the formation.

Of similar construction is a second type of resistivity tool called an electromagnetic propagation (EMP) tool. These tools operate at much higher frequencies than induction tools (about $10^6$ Hz as compared with about $10^4$ Hz). EMP tools use transmitter coils to transmit radio frequency signals into the formation, and use receiver coils to measure the relative amplitude and phase of the signals received by the receivers. The attenuation and phase shift of the signals is indicative of the conductivity of the formation. Higher frequency signals provide a higher measurement accuracy, but tend to have a reduced investigation depth. Consequently, when multiple transmitter coils are present, the transmitter-receiver configuration(s) with a shallower investigation depth may employ a higher frequency (e.g. 2 MHz) for better accuracy, and transmitter-receiver configuration(s) with deeper investigation depths may require a lower frequency (e.g. 0.5 MHz) for adequate performance.

Figure 2:
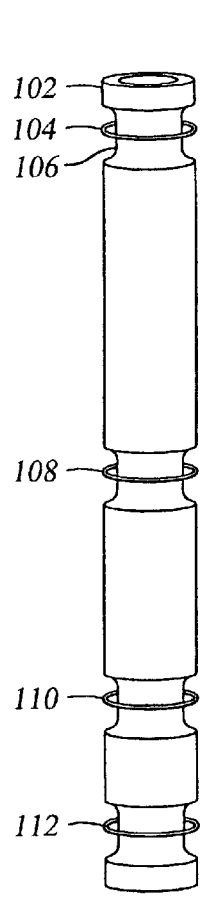
FIG. 2 is a perspective view of an azimuthally-insensitive resistivity tool.

Referring now to FIG. 2, a resistivity tool subassembly 102 is shown. The subassembly 102 is provided with one or more regions 106 of reduced diameter. A wire coil 104 is placed in the region 106 and spaced away from the surface of subassembly 102 by a constant distance. To mechanically support and protect the coil 104, a non-conductive filler material (not shown) such as epoxy, rubber, or ceramics may be used in the reduced diameter regions 106. Coil 104 is a transmitter coil, and coils 110 and 112 are receiving coils. In operation, transmitter coil 104 transmits an interrogating electromagnetic signal which propagates through the wellbore and surrounding formation. Receiver coils 110, 112 detect the interrogating electromagnetic signal and provide a measure of the electromagnetic signal's amplitude attenuation and phase shift between coils 110 and 112. From the amplitude attenuation and phase shift, the resistivity of the formation can be estimated using conventional techniques.

Alternatively, if the resistivity is generally known, the amplitude and phase shift information may be used in accordance with conventional techniques to estimate the distance to the nearest boundary layer. Advantageously, a second transmitter coil 108 may be added to the subassembly to provide additional resistivity measurements. The signal measurements from two (or more) different transmitter-receiver coil spacings provide enough information to determine formation resistivity and the distance to any nearby boundary layer. The first transmitter 104 may be spaced approximately 30 inches from the last receiver coil 112. The transmitter and receiver coils may comprise as little as one loop of wire, although more loops may provide additional signal power. The distance between the coils and the tool surface is preferably in the range from $\frac{1}{16}$ inch to $\frac{3}{4}$ inch, but may be larger.

The equations used to determine resistivity and distance to the boundary layer can be derived by performing numerical modeling for the tool geometry in various locations relative to a boundary between materials of differing resistivities. Alternatively, the equations can be determined empirically. Both techniques are commonly employed by those in the art.

While the distance to the nearest boundary layer is of importance, of greater importance is the direction of the nearest boundary layer. In the horizontal drilling environment, the borehole is preferably steered away from bed boundaries to avoid straying into an adjacent shale bed and thereby keep the borehole in a target pay zone. Since the coils in FIG. 2 are co-axial to the subassembly 102, the coil configuration of subassembly 102 is unable to provide this information. This coil configuration lacks azimuthal sensitivity.

Figure 3:
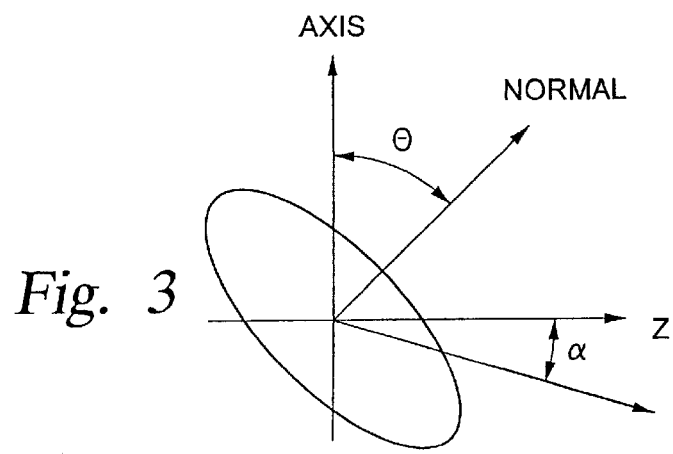
FIG. 3 defines a set of reference coordinates of a resistivity tool.

Before proceeding to an improved configuration, some helpful terminology is first defined with reference to FIG. 3. FIG. 3 shows a coordinate system having one coordinate axis along the axis of the resistivity tool, and a second coordinate axis pointing from the tool axis to the tool face scribe line (defined earlier during the discussion of MWD sensors). Hereafter, the azimuth is defined as the angle from the tool scribe line. The wire coils discussed herein are approximately planar, i.e. they reside in a flat plane. The orientation of a plane (and hence, the coils) can be described by a vector perpendicular to the plane. This perpendicular vector is called a "normal" vector. FIG. 3 shows a coil having a normal vector at a skew angle $\theta$ from the tool axis and an azimuth angle of $\alpha$. The azimuth angle $\alpha$ can be found by projecting the normal vector into a plane perpendicular to the tool axis. The projection is shown as a dashed arrow in FIG. 3.

Figure 4:
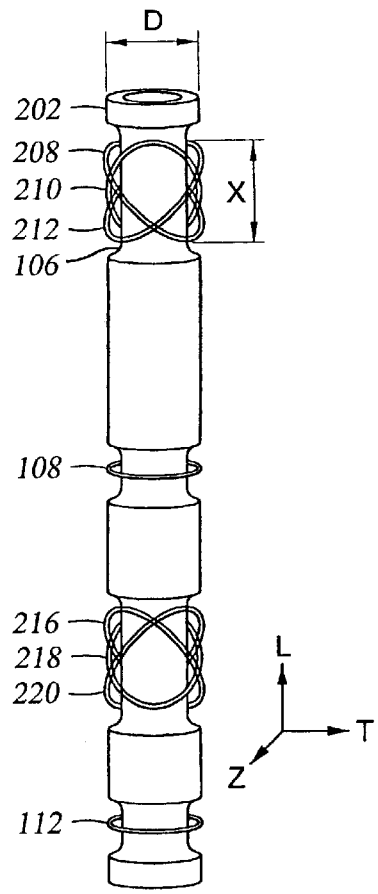
FIG. 4 is a perspective view of a first embodiment of an azimuthally sensitive resistivity tool.

FIG. 4 shows a resistivity tool 202 which can measure azimuthal resistivity variations. In accordance with a preferred embodiment, coil 110 is replaced by a first set of three skewed coils 216, 218, 220 located at the same position along the length of resistivity tool 202. The three skewed coils are oriented at a skew angle $\theta$ from the tool axis. The three skewed coils are preferably provided with equally spaced azimuth angles a (e.g. 0°, 120°, and 240°). Non-equally spaced azimuthal angles can also be employed. In one specific implementation, the skew angle $\theta$ is chosen to be 54.74° so that the normal vectors of skewed coils 216, 218, and 220 are perpendicular to each other. The three skewed coils 216, 218, and 220 are preferably employed as receiver coils as discussed further below.

A second set of three skewed coils 208, 210, 212 may also be provided on resistivity tool 202. If included, skewed coils 208, 210, 212 are preferably employed as transmitter coils in place of coil 104. Preferably the second set of skewed coils 208, 210, 212 is azimuthally positioned to line up with the first set of skewed coils 220, 218, and 216, respectively, and are each oriented at a skew angle of $\theta$ with respect to the resistivity tool axis. In other words, the pairs of skewed coils are skewed towards each other.

The skewed coils may be constructed similarly to the coils of FIG. 2, that is, they may be placed in a recessed region of tool 202 and uniformly spaced away from the surface of tool 202 by a constant distance. The skew angle $\theta$ is related to the coil diameter D and the longitudinal spread X according to tan $\theta$=X/D.

It is noted that the azimuthal sensitivity may be achieved by skewing either the transmitter coils or the receiver coils. It is not strictly necessary to have both transmitter and receiver coils skewed, although this latter configuration is presently preferred.

The signals received by the set of skewed receiver coils 218, 216, 220, (respectively referred to hereafter as $R_1$, $R_2$, $R_3$) can be expressed as a linear combination of signals received by three virtual receiver coils $R_L$, $R_Z$, and $R_T$. $R_L$ is a virtual receiver coil oriented longitudinally on tool 202 (skew angle $\theta$=0), $R_Z$ is a virtual receiver coil oriented in the zero azimuth direction ($\theta$=90°, $\alpha$=0°), and $R_T$ is a virtual receiver coil oriented orthogonal to both $R_L$ and $R_Z$ ($\theta$=90°, $\alpha$=90°). Accordingly, the signals received at skewed receiver coils $R_1$, $R_2$, $R_3$ must be manipulated to derive signals that would have been received at the three (non-existent) virtual receiver coils $R_L$, $R_Z$, $R_T$ if these coils actually existed. It can be shown that:

$$S(R_1)=S(R_L) \cos \theta+S(R_Z) \sin \theta$$

$$S(R_2)=S(R_L) \cos \theta+(S(R_Z) \cos 120°+S(R_T) \sin 120°) \sin \theta$$

$$S(R_3)=S(R_L) \cos \theta+(S(R_Z) \cos 240°+S(R_T) \sin 240°) \sin \theta$$

where $\theta$ is the skew angle of the actual receivers $R_1$, $R_2$ and $R_3$, and $S(R_1)$ is the signal received by receiver $R_1$. These equations can be manipulated to express the response of the virtual receivers in terms of the signals received by receivers $R_1$, $R_2$, $R_3$:

$$S(R_L)=(S(R_1)+S(R_2)+S(R_3))/(3 \cos \theta)$$

$$S(R_Z)=(2S(R_1)-(S(R_2)+S(R_3)))/(3 \sin \theta)$$

$$S(R_T)=(S(R_2)-S(R_3))/(\text{sqrt}(3) \sin \theta)$$

Such equations can be derived for virtual receivers of varying orientations. This method of linearly combining signals from a set of receiver coils to determine the response of one or more virtual receivers is hereafter called virtual receiver synthesis or "synthesizing a virtual receiver response".

This method of creating virtual coils is not limited to receivers. Virtual transmitters can also be emulated by combining the excitations of a set of actual transmitters. Signals transmitted by the set of skewed transmitter coils 210, 208, 212, (respectively referred to hereafter as $T_1$, $T_2$, $T_3$) can be expressed as a linear combination of the signals transmitted by three virtual transmitters $T_L$, $T_Z$, $T_T$. It can be shown that:

$$S(T_1)=S(T_L) \cos \theta+S(T_Z) \sin \theta$$

$$S(T_2)=S(T_L) \cos \theta+(S(T_Z) \cos 120°+S(T_T) \sin 120°) \sin \theta$$

$$S(T_3)=S(T_L) \cos \theta+(S(T_Z) \cos 240°+S(T_T) \sin 240°) \sin \theta$$

where $\theta$ is the skew angle of the actual transmitters $T_1$, $T_2$ and $T_3$. These equations can be manipulated to express the transmitted signals of the virtual transmitters in terms of the signals transmitted by the actual transmitters $T_1$, $T_2$, $T_3$:

$$S(T_L)=(S(T_1)+S(T_2)+S(T_3))/(3 \cos \theta)$$

$$S(T_Z)=(2S(T_1)-(S(T_2)+S(T_3)))/(3 \sin \theta)$$

$$S(T_T)=(S(T_2)-S(T_3))/(\text{sqrt}(3) \sin \theta)$$

Such equations may be derived for virtual transmitters with various other orientations. It is not necessary to simultaneously excite transmitters $T_1$, $T_2$, $T_3$. The transmitters can be excited sequentially if the results can later be combined according to the derived equations.

Referring now to FIGS. 2 and 4, an example is hereby provided to illustrate the operation of resistivity tool 202 and to show how the measurements of resistivity tool 102 can be duplicated by resistivity tool 202. The set of transmitter coils $T_1$, $T_2$ and $T_3$ is used to synthesize a virtual transmitter $T_L$ to replace transmitter 104, transmitter coil 108 (hereafter $T_4$) remains the same, the set of receiver coils $R_1$, $R_2$, $R_3$ is used to synthesize a virtual receiver $R_L$ to replace receiver 110, and receiver coil 112 (hereafter $R_4$) remains unchanged.

The signal $S(R_4,T_4)$ generated in receiver coil $R_4$ due to signals transmitted by transmitter coil $T_4$ can be expressed as a product of a coupling constant $C_{44}$ and the signal $S(T_4)$ that excites the transmitter coil. Since the coupling constant $C_{44}$ is a function of the formation resistivity $\rho$ and the relative geometry of the transmitting and receiving coils:

$$S(R_4,T_4)=C_{44}S(T_4) \qquad (1)$$

$S(R_4,T_4)$ can be directly measured in tool 202. However, signal measurements for virtual receivers and transmitters need to be calculated from actual receiver measurements. Accordingly, the signal generated in receiver coil $R_4$ by virtual transmitter coil $T_L$ can be expressed in the following way:

$$S(R_4,T_L)=C_{L4}S(T_L)=C_{L4}(S(T_1)+S(T_2)+S(T_3))/(3 \cos \theta)$$

Since the coupling constant $C_{L4}$ is equal to the coupling constant $C_{14}$ multiplied by $\cos \theta$, the above equation can be rewritten:

$$S(R_4,T_L)=(S(R_4,T_1)+S(R_4,T_2)+S(R_4,T_3))/3 \qquad (2)$$

Consequently, the signals measured in receiver coil $R_4$ due to the signals transmitted by transmitter coils $T_1$, $T_2$, $T_3$ can be combined to determine the response of receiver coil $R_4$ to the virtual transmitter $T_L$.

A similar equation for a virtual receiver coil's response to a transmitter can be found. The signal received by the virtual receiver coil $R_L$ due to fields generated by transmitter $T_4$ can be expressed in the following way:

$$S(R_L,T_4)=(S(R_1,T_4)+S(R_2,T_4)+S(R_3,T_4))/(3 \cos \theta) \qquad (3)$$

Although a bit more involved, the signal received by virtual receiver coil $R_L$ due to fields generated by virtual transmitter $T_L$ can also be expressed in terms of actual receiver and transmitter coils:

$$S(R_L,T_L)=(S(R_1,T_L)+S(R_2,T_L)+S(R_3,T_L))/(3 \cos \theta) \qquad (3)$$

$$S(R_L,T_L)=(C_{L1}S(T_L)+C_{L2}S(T_L)+C_{L3}S(T_L))/(3 \cos \theta)$$

$$S(R_L,T_L)=(C_{L1}+C_{L2}+C_{L3})(S(T_1)+S(T_2)+S(T_3))/(9 \cos^2 \theta)$$

$$S(R_L,T_L)=(S(R_1,T_1)+S(R_1,T_2)+S(R_1,T_3)+S(R_2,T_1)+S(R_2,T_2)+S(R_2,T_3)+S(R_3,T_1)+S(R_3,T_2)+S(R_3,T_3))/(9 \cos \theta) \qquad (4)$$

Thus measured signals from actual receiver coils $R_1$, $R_2$, $R_3$, and $R_4$, in response to signals transmitted by transmitter coils $T_1$, $T_2$, $T_3$, $T_4$, can be combined according to equations (1), (2), (3), and (4) to determine the signals that would have been measured by receiver coils 110, 112, in response to signals transmitted by transmitter coils 104, 106. In other words, by individually measuring and then combining the signals that the actual transmitter coils produce in the actual receiver coils, the original functionality of resistivity tool 102 can be reproduced by resistivity tool 202.

In accordance with conventional techniques, resistivity tool 102 measures formation resistivity by comparing the signals induced in the receiver coils by a single transmitter. (The first and second transmitters are used separately to obtain different resistivity measurement depths.) The attenuation and phase difference between the received signals are known functions of the formation resistivity in a homogeneous formation. They can be used independently to measure the resistivity. In an anisotropic formation, the phase difference and attenuation measurements can be combined to determine both the horizontal and vertical resistivities.

Resistivity tool 202 may employ these conventional techniques in conjunction with the synthesis equations derived above to duplicate the functionality of resistivity tool 102. More important, however, is the versatility and added functionality provided by tool 202.

The uniformity, or "homogeneity", of a formation may be used as an indicator of the proximity of a bed boundary. Homogeneity can be determined by synthesizing virtual coil responses $S(R_Z,T_L)$ and $S(R_T,T_L)$. In a homogeneous formation, these signals are zero. Non-negligible signal measurements indicate the presence of a nearby bed boundary. The virtual response signal $S(R_Z,T_L)$ can be derived in terms of actual signal measurements as follows:

$$S(R_Z,T_L)=(2S(R_{1,TL})-(S(R_2,T_L)+S(R_3,T_L)))/(3 \sin \theta)$$

$$S(R_Z,T_L)=(2C_{L1}(\rho)S(T_L)-(C_{L2}(\rho)S(T_L)+C_{L3}(\rho)S(T_L)))/(3 \sin \theta)$$

$$S(R_Z,T_L)=(2C_{L1}(\rho)-(C_{L2}(\rho)+C_{L3}(\rho)))(S(T_1)+S(T_2)+S(T_3))/(9 \sin \theta \cos \theta)$$

$$S(R_Z,T_L)=(2(S(R_1,T_1)+S(R_1,T_2)+S(R_1,T_3))-(S(R_2,T_1)+S(R_2,T_2)+S(R_2,T_3)+S(R_3,T_1)+S(R_3,T_2)+S(R_3,T_3)))/(9 \sin \theta) \qquad (5)$$

The virtual response signal $S(R_T,T_L)$ can also be derived:

$$S(R_T,T_L)=(S(R_2,T_1)-S(R_3,T_L))/(\sqrt{3} \sin \theta)$$

$$S(R_T,T_L)=(C_{L2}(\rho)S(T_L)-C_{L3}(\rho) S(T_L))/(3^{1/2} \sin \theta)$$

$$S(R_T,T_L)=(C_{L2}(\rho)-C_{L3}(\rho))(S(T_1)+S(T_2)+S(T_3))/(3^{3/2} \sin \theta \cos \theta)$$

$$S(R_T,T_L)=((S(R_2,T_1)+S(R_2,T_2)+S(R_2,T_3)-(S(R_3,T_1)+S(R_3,T_2)+S(R_3,T_3)))/(3^{3/2} \sin \theta) \qquad (6)$$

Accordingly, equations (5) and (6) may be used to synthesize the virtual response signals from actual signal measurements. In a homogeneous formation (i.e. no bed boundaries are nearby), $S(R_Z,T_L)$ and $S(R_T,T_L)$ equal zero. When a nearby bed boundary lies in the $\alpha=0$ direction, $S(R_T,T_L)$ will be negligible and the amplitude of $S(R_Z,T_L)$ may be used to estimate the distance to the boundary. For other azimuthal angles, the angle a which maximizes the amplitude of $$S(R_Z',T_L)=S(R_Z,T_L) \cos \alpha + S(R_T,T_L) \sin \alpha$$

is the azimuthal direction (with 180° ambiguity) of the bed boundary. The phase of $S(R_Z,T_L)$ can be used to resolve the 180° ambiguity, and the maximized magnitude of $S(R_Z',T_L)$ may be used to estimate the distance to the bed boundary.

Figure 5:
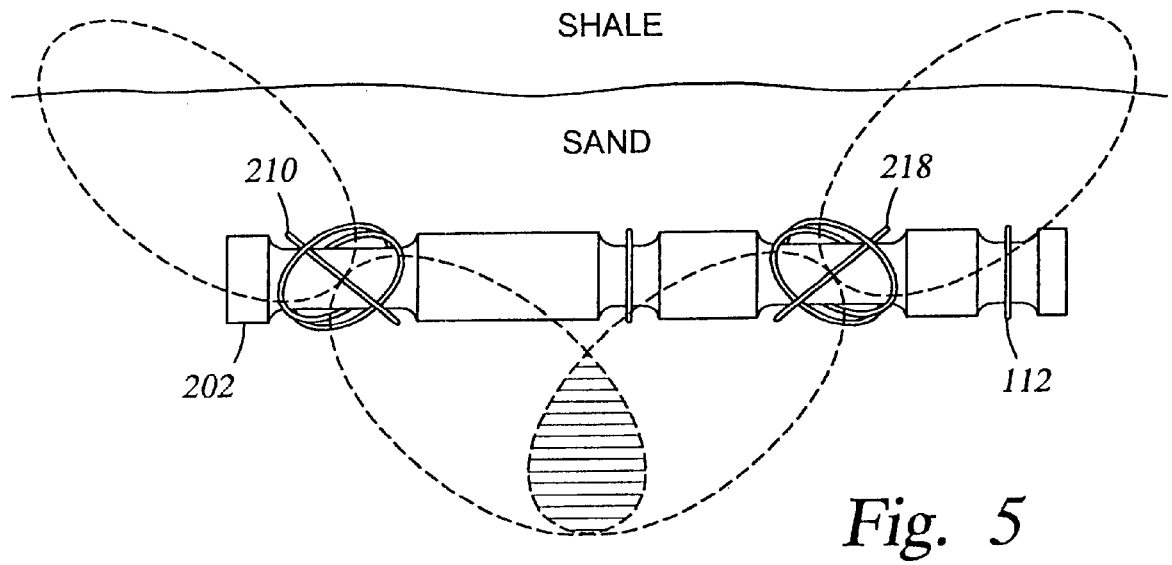
FIG. 5 is a side view of an azimuthally sensitive resistivity tool showing approximate transmitter and receiver gain patterns.

Another method for determining the direction of the boundary is to measure the azimuthal resistivities, and then form a direction vector from the measurements. The amplitude of signal $S(R_1,T_1)$ is primarily indicative of the resistivity of the region of the formation between transmitter $T_1$ and receiver $R_1$ in the azimuth $\alpha=0$ direction. FIG. 5 shows a first order approximation of the gain patterns for transmitter $T_1$ (210) and receiver $R_1$ (218). The shaded overlap region is the region which most affects the resistivity measurement of signal $S(R_1,T_1)$. As one skilled in the art will understand, receiver coil 112 ($R_4$) may be used to determine an attenuation and phase difference if accurate quantitative measurements are desired. In other words, the relative amplitude and phase of measured signals $S(R_4,T_1)$ and $S(R_1,T_1)$ may be used to form estimates of azimuthal resistivity with better accuracy than may be achieved from $S(R_1,T_1)$ alone.

The amplitude of signal $S(R_2,T_2)$ is primarily indicative of the formation resistivity in the azimuth $\alpha=120°$ direction, and the amplitude of signal $S(R_3,T_3)$ is primarily indicative of the formation resistivity in the azimuth $\alpha=240°$ direction. Azimuthal sensitivities can also be obtained for any azimuthal angle using the virtual response synthesis method.

For example, one can construct a virtual transmitter $T_\alpha$ directed in the azimuthal direction a from the actual transmitters $T_1$, $T_2$, and $T_3$, and can construct a virtual receiver $R_\alpha$ in the same a azimuthal direction from receivers $R_1$, $R_2$, and $R_3$. The amplitude of the synthesized response $S(R_\alpha, T_\alpha)$ is then indicative of the resistivity in the desired $\alpha$ direction.

One low-complexity way to synthesize a transmitter $T_{\alpha=60}$ is to simply add the signals of $T_1$ and $T_2$ together. The skew angle $\theta$ is changed somewhat, but this effect may be empirically compensated or ignored. A virtual receiver $R_{\alpha=60}$ can be constructed similarly. It can be shown that the signal $S(R_{60}, T_{60})$ may be expressed:

$$S(R_{60},T_{60})=S(R_1,T_1)+S(R_1,T_2)+S(R_2,T_1)+S(R_2,T_2) \quad (7)$$

The $S(R_{180}, T_{180})$ and $S(R_{300}, T_{300})$ signals may be similarly expressed:

$$S(R_{180},T_{180})=S(R_2,T_2)+S(R_2,T_3)+S(R_3,T_2)+S(R_3,T_3) \quad (8)$$

$$S(R_{300},T_{300})=S(R_1,T_1)+S(R_1,T_3)+S(R_3,T_1)+S(R_3,T_3) \quad (9)$$

Figure 6:
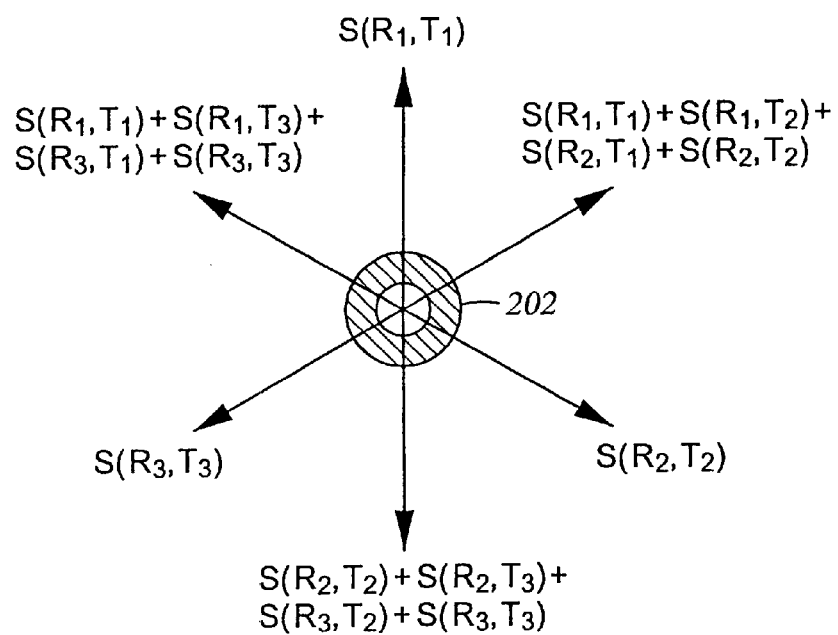
FIG. 6 is an end view of an azimuthally sensitive resistivity tool showing azimuthal orientations of various resistivity measurements.

As shown in FIG. 6, these equations provide azimuthal resistivity measurements in six equally spaced directions. These six measurements can be processed to give a directional vector indicating the direction of a nearby boundary. For example:

$$\text{Direction}=(\rho_0 \cos 0°+\rho_{60} \cos 60°+\rho_{120} \cos 120°+\rho_{180} \cos 180°+\rho_{240} \cos 240°+\rho_{300} \cos 300°)\hat{i}$$

$$+(\rho_0 \sin 0°+\rho_{60} \sin 60°+\rho_{120} \sin 120°+\rho_{180} \sin 180°+\rho_{240} \sin 240°+\rho_{300} \sin 300°)\hat{j}$$

A variety of ways may be used for estimating the distance to the bed boundary. For example, the change in apparent resistivity (derived from $S(R_L, T_L)$) can be used to estimate the distance. Alternatively, the magnitude of the Direction vector defined above can be used to estimate the distance.

Figure 7:
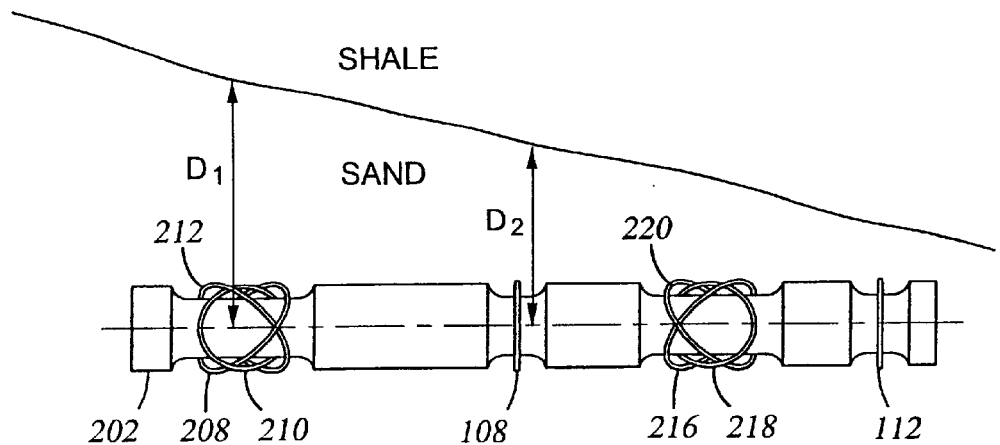
FIG. 7 is a side view of an azimuthally sensitive resistivity tool approaching a bed boundary.

When the tool includes more than one transmitter to provide multiple transmitter-receiver spacings, the apparent resistivity at various distances from the tool can be measured. With reference to FIG. 7, when the tool is nearly parallel to the boundary, the difference in apparent resistivities for the different receiver-transmitter configurations can be used to provide estimates of the distances $D_1$, $D_2$ (and angle of approach) to the bed boundary. To increase the reliability of this estimate, the rate of change of the apparent resistivities can be tracked for additional information.

Figure 8:
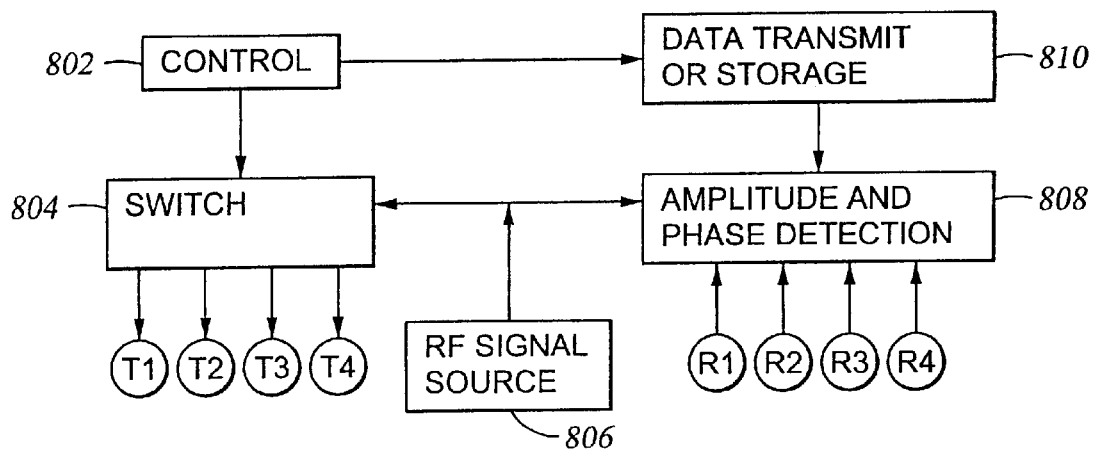
FIG. 8 is a functional block diagram of the electronics of a resistivity tool.

FIG. 8 shows a functional block diagram of the electronics for resistivity tool 202. The electronics include a control module 802 which is coupled to an analog switch 804. Analog switch 804 is configured to drive any one of the transmitter coils $T_1$, $T_2$, $T_3$, $T_4$ with a high frequency signal from radio-frequency signal source 806. The control module 802 preferably selects a transmitter coil, pauses long enough for transients to die out, then signals data storage/transmit module 810 to accept an amplitude and phase sample of the signals received by each of the receivers. The control module 802 preferably repeats this process sequentially for each of the transmitters. The amplitude and phase shift values are provided by amplitude and phase shift detector 808 which is coupled to each of the receiver coils $R_1$, $R_2$, $R_3$, $R_4$ for this purpose. Preferably, the $S(R_j, T_i)$ amplitude and phase samples are transmitted to the surface for processing to determine (i) formation resistivity, (ii) distance to nearest bed boundary, (iii) direction of nearest bed boundary, and (iv) resistivity of any nearby adjacent beds. The data storage/transmitter module 810 may be coupled to signaling unit 35 (FIG. 1) to transmit signal measurements to the surface.

Signaling unit 35 can use any of several known techniques for transmitting information to the surface, including but not limited to (1) mud pressure pulse; (2) hard-wire connection; (3) acoustic wave; and (4) electromagnetic waves.

Figure 10:
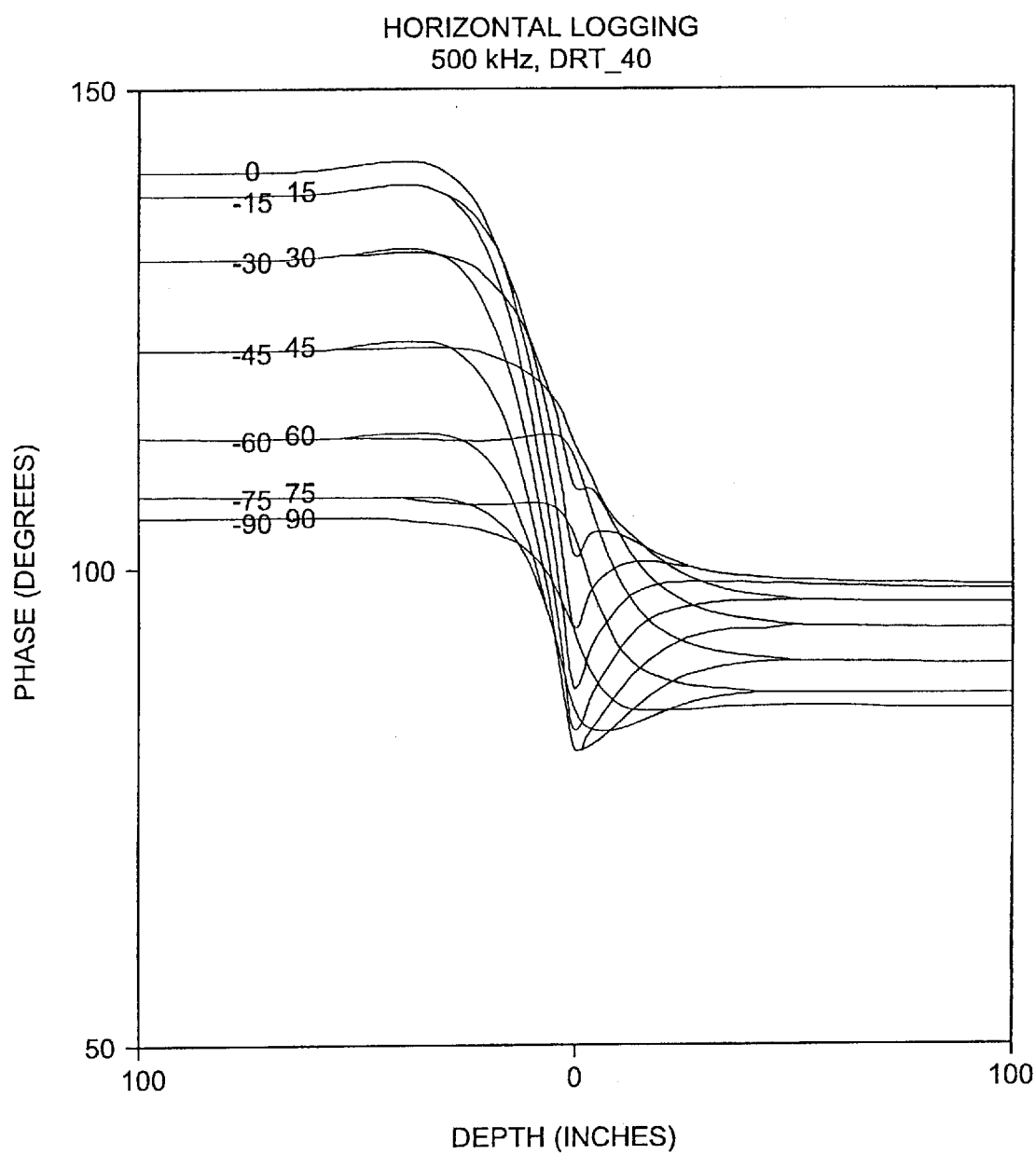
FIG. 10 is a graph of the theoretical phase shift observed near a bed boundary for a first azimuthally sensitive resistivity tool embodiment.

FIG. 10 shows the phase of $S(R_{1,T1})$ relative to the transmitted signal. The phase is shown as a function of distance from a bed boundary between a homogeneous 1 $\Omega$m medium (e.g. shale) and a homogeneous 10 $\Omega$•m medium (e.g. sandstone). The resistivity tool 202 is assumed to be parallel to the bed boundary, at a depth D, and oriented so that the boundary is in the $\alpha=0$ azimuthal direction. The transmitter and receiver are spaced 40 inches apart, and a 0.5 MHz signal is used. The negative depth values (left side of the graph) indicate that the tool 202 is actually in the shale (boundary in the $\alpha=180°$ direction), and the positive depth values (right side) indicate that the tool is in the sandstone (boundary in the $\alpha=0°$ direction). Curves are shown for the skew angles of $\theta=0$, $\pm 15°$, $\pm 30°$, $\pm 45°$, $\pm 60°$, $\pm 75°$, $\pm 90°$. Close scrutiny reveals that with the tool in the sandstone, the phase shift can theoretically be used to observe the boundary from over 40 inches away.

Figure 11:
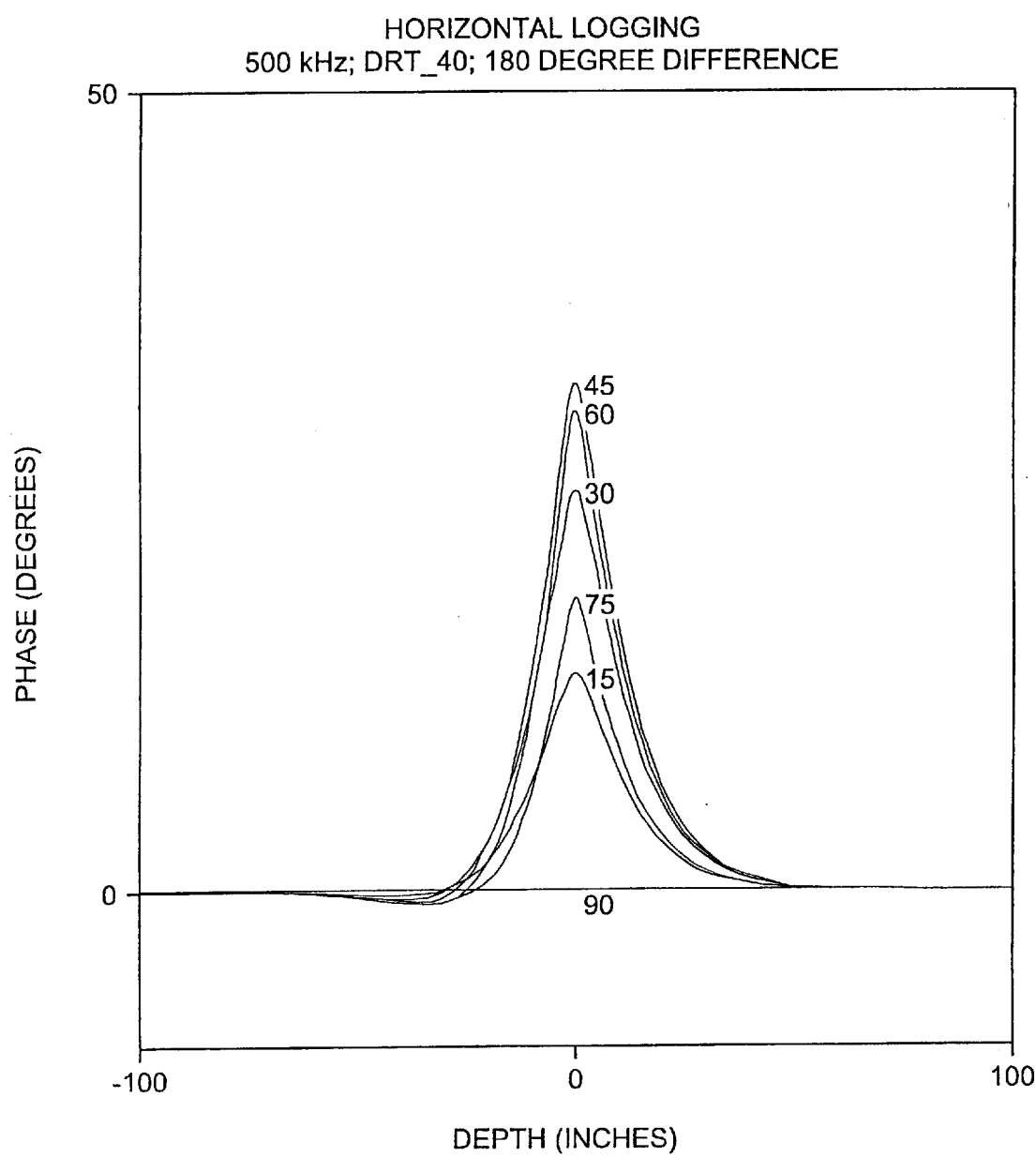
FIG. 11 is a graph of the theoretical 180 degree phase difference observed near a bed boundary for a first azimuthally sensitive resistivity tool embodiment.

FIG. 11 shows the phase difference between $S(R_1, T_1)$ and $S(R_{180}, T_{180})$ as a function of distance from a bed boundary, with the same conditions as before. Here it is observed that the coils skewed at angles between $\theta=45°$ and $60°$ exhibit the greatest phase sensitivity to the boundary.

Figure 12:
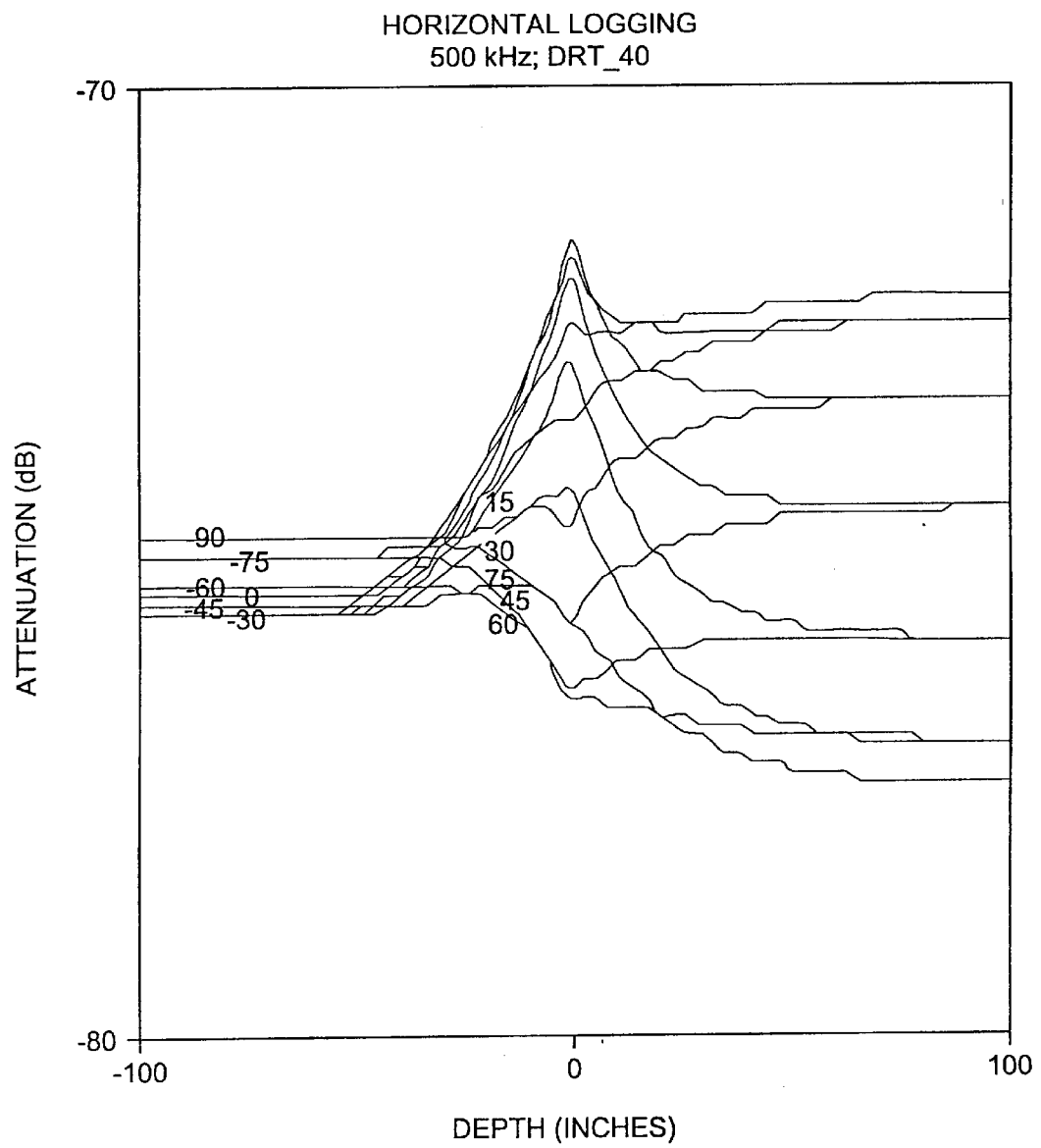
FIG. 12 is a graph of the theoretical amplitude attenuation observed near a bed boundary for a first azimuthally sensitive resistivity tool embodiment.

FIG. 12 shows the amplitude of $S(R_1, T_1)$ relative to the amplitude of the transmitted signal as a function of distance from a bed boundary, with the same conditions as before. Close scrutiny reveals that with the tool in the sandstone, the signal amplitude can theoretically be used to observe the boundary from over 60 inches away.

Figure 13:
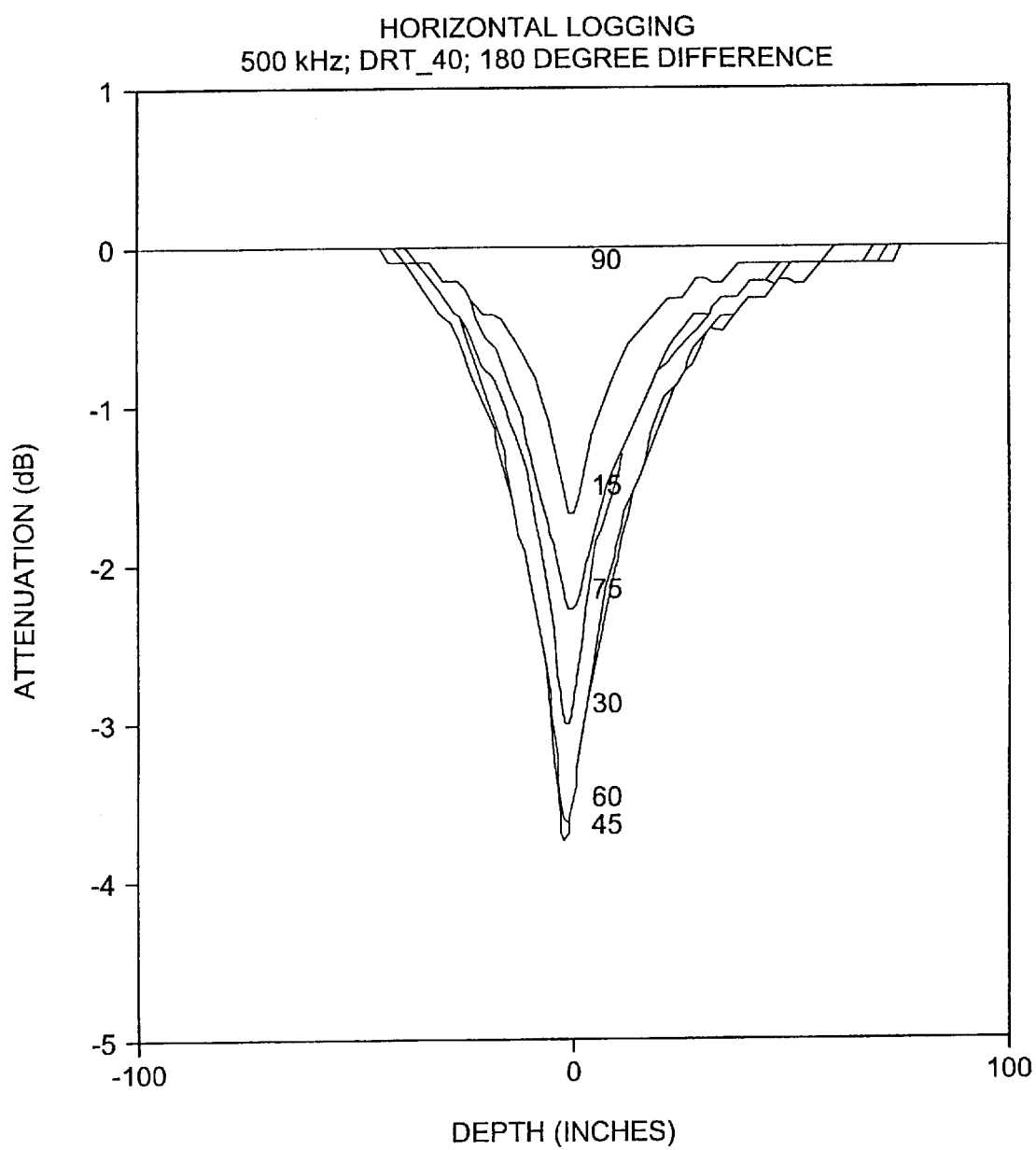
FIG. 13 is a graph of the theoretical 180 degree amplitude attenuation observed near a bed boundary for a first azimuthally sensitive resistivity tool embodiment.

FIG. 13 shows the amplitude of $S(R_{1,T1})$ relative to $S(R_{180}, T_{180})$ as a function of distance from a bed boundary, with the same conditions as before. Here it is again observed that the coils skewed at angles between $\theta=45°$ and $60°$ exhibit the greatest sensitivity to the boundary.

It is noted that the investigation depth of the signal $S(R_j, T_i)$ is determined not only by the transmitter-receiver spacing, but also by the skew angle $\theta$ of the antenna coils. Virtual antennas with digitally variable skew angles can be synthesized by taking a suitable combination of $T_L$ and $T_Z$ or $T_T$ components. This may be a method for creating sensitive coil configurations if mechanical considerations prevent the coils from being mounted at the desired skew angles.

Figure 9:
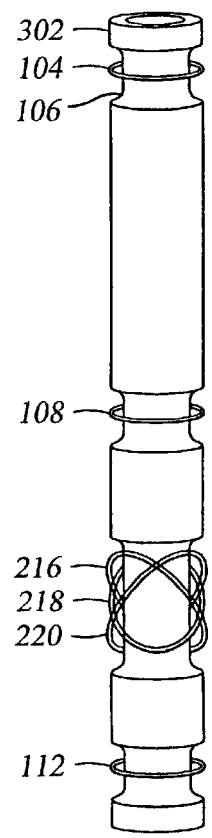
FIG. 9 is a perspective view of a second embodiment of an azimuthally sensitive resistivity tool.

FIG. 9 shows a resistivity tool 302 with an alternate configuration. In this configuration, an actual transmitter coil 104 serves as transmitter $T_L$. This reduces computational costs and construction effort, but preserves the desired azimuthal sensitivity. The virtual response synthesis equations for this configuration can be shown to be:

$$S(R_L,T_L)=(S(R_{1,TL})+S(R_2,T_L)+S(R_3,T_L))/(3 \cos \theta) \quad (10)$$

$$S(R_{Z,TL})=(2S(R_1,T_L)-(S(R_2,T_L)+S(R_3,T_L)))/(3 \sin \theta) \quad (11)$$

$$S(R_T,T_L)=(S(R_2,T_L)-S(R_3,T_L))/(\sqrt{3} \sin \theta) \quad (12)$$

As mentioned previously, in a homogeneous formation (i.e. no bed boundaries are nearby), $S(R_Z, T_L)$ and $S(R_T, T_L)$ equal zero. When a nearby bed boundary lies in the $\alpha=0$ direction, $S(R_T, T_L)$ will be negligible and the amplitude of $S(R_Z, T_L)$ may be used to estimate the distance to the boundary. For other azimuthal angles, the angle $\alpha$ which maximizes $$S(R_{Z'},T_L)=S(R_Z,T_L) \cos \alpha + S(R_T,T_L) \sin \alpha$$

is the azimuthal direction of the bed boundary. The magnitude of $S(R_{Z'}, T_L)$ may be used to estimate the distance to the bed boundary.

Figure 14:
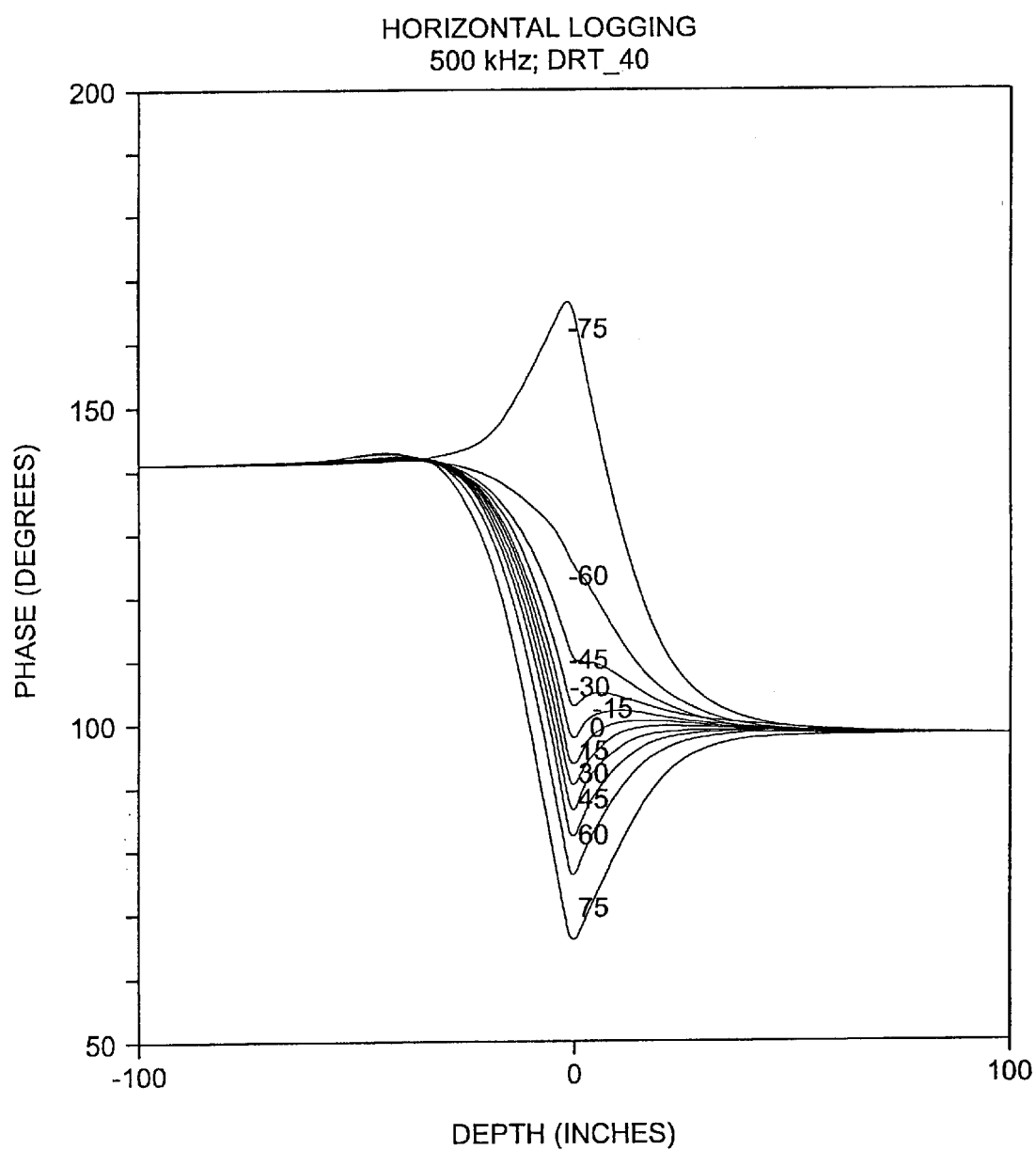
FIG. 14 is a graph of the theoretical phase shift observed near a bed boundary for a second azimuthally sensitive resistivity tool embodiment.

FIG. 14 shows the phase of $S(R_1,T_L)$ relative to the transmitted signal as a function of distance from a bed boundary. Note that in this and the following graphs, only the receiver coil orientation changes as the skew angle θ is changed. The other conditions remain the same. Again, the phase can be used to observe the boundary from over 40 inches away.

Figure 15:
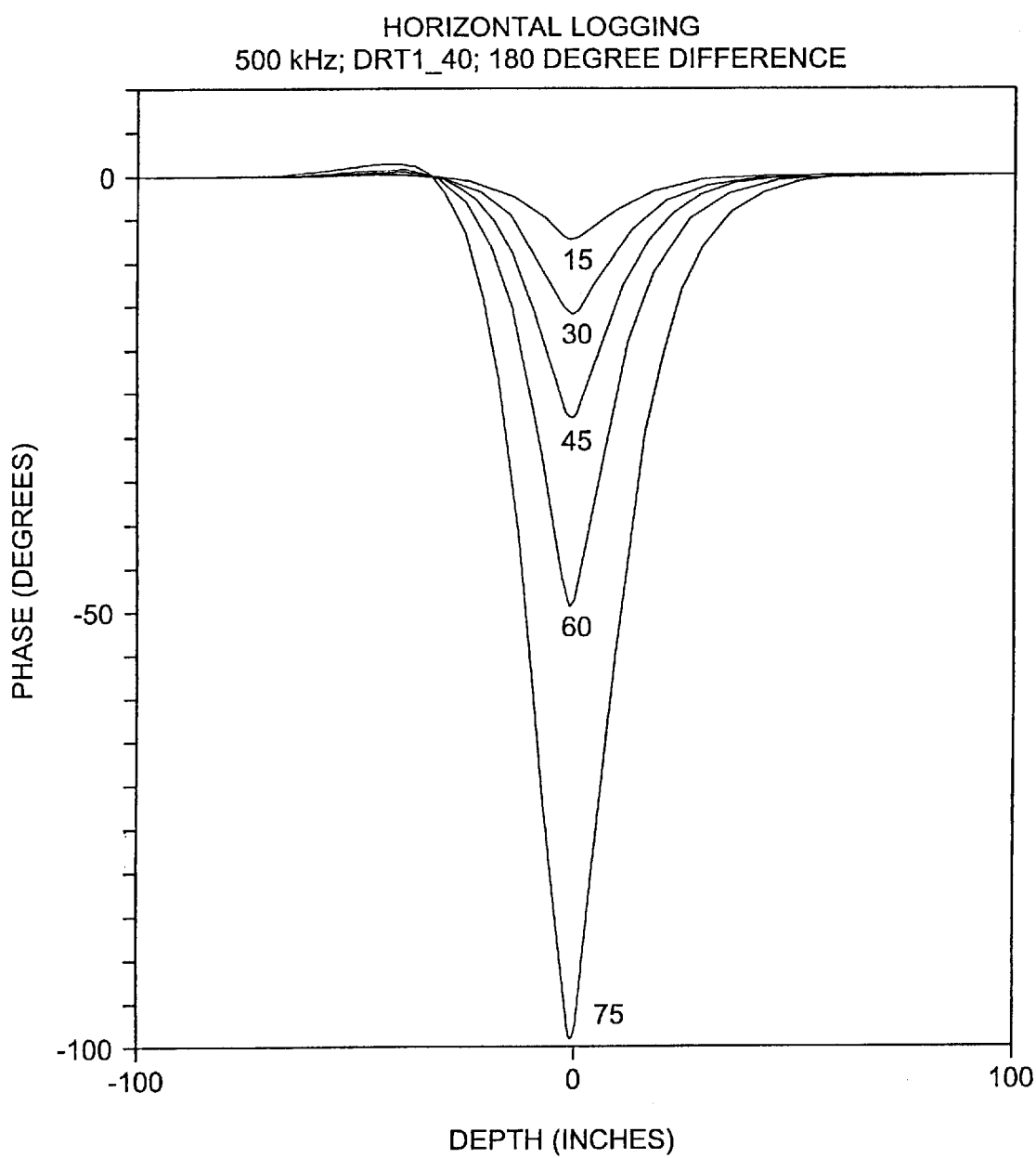
FIG. 15 is a graph of the theoretical 180 degree phase difference observed near a bed boundary for a second azimuthally sensitive resistivity tool embodiment.

FIG. 15 shows the phase difference between $S(R_{1,TL})$ and $S(R_{180},T_L)$ as a function of distance from a bed boundary, with the same conditions as before. Here it is observed that the coils skewed at the larger skew angles are more phase sensitive to the boundary presence. However, the signal amplitude is also decreased at the larger skew angles, so a compromise angle of about 60° may be preferred.

Figure 16:
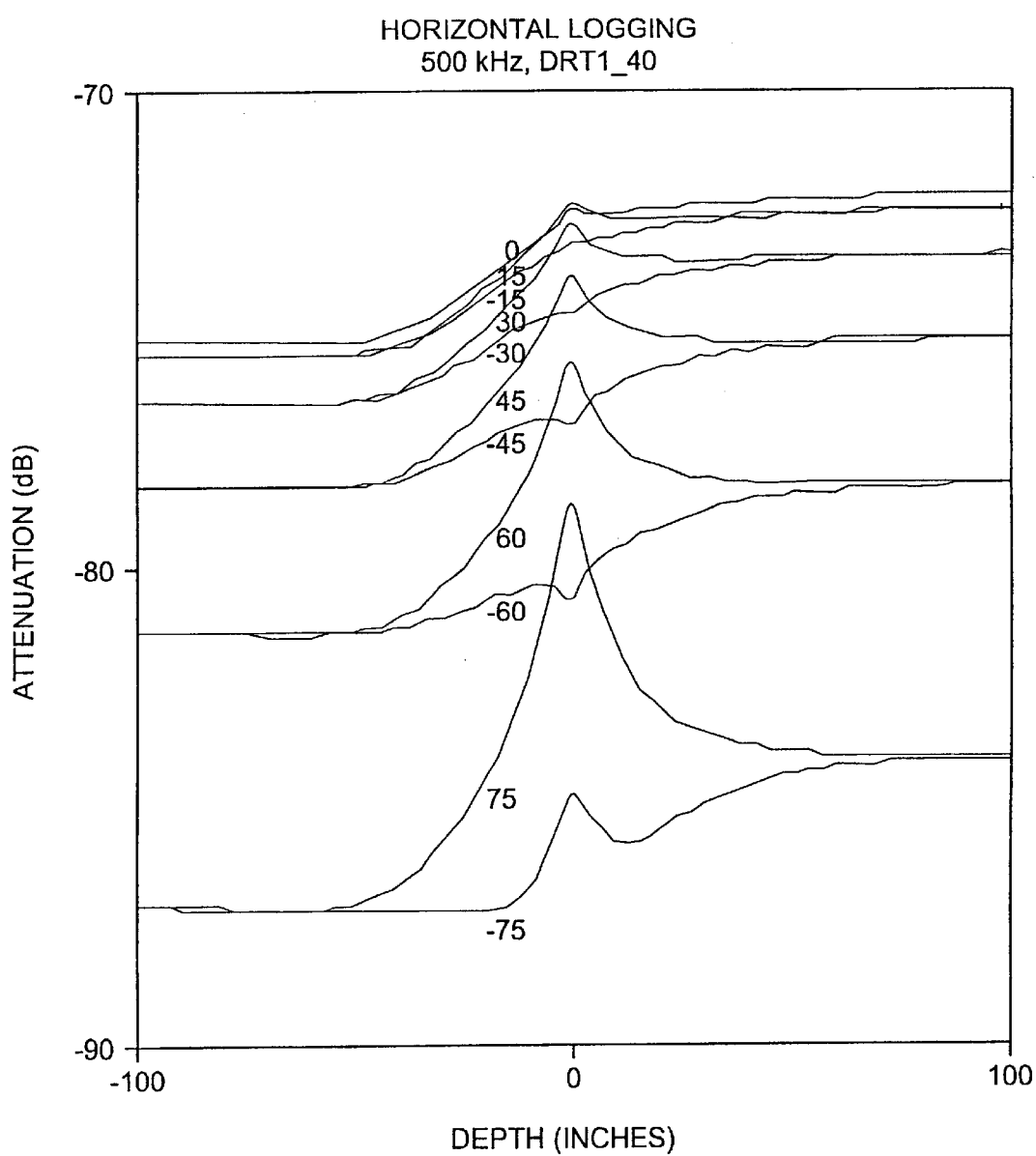
FIG. 16 is a graph of the theoretical amplitude attenuation observed near a bed boundary for a second azimuthally sensitive resistivity tool embodiment.

FIG. 16 shows the amplitude of $S(R_{1,TL})$ relative to the amplitude of the transmitted signal as a function of distance from a bed boundary, with the same conditions as before. Close scrutiny reveals that with the tool in the sandstone, the signal amplitude can theoretically be used to observe the boundary from over 50 inches away. The previously mentioned heavy attenuation of signals at increased skew angles is evident here.

Figure 17:
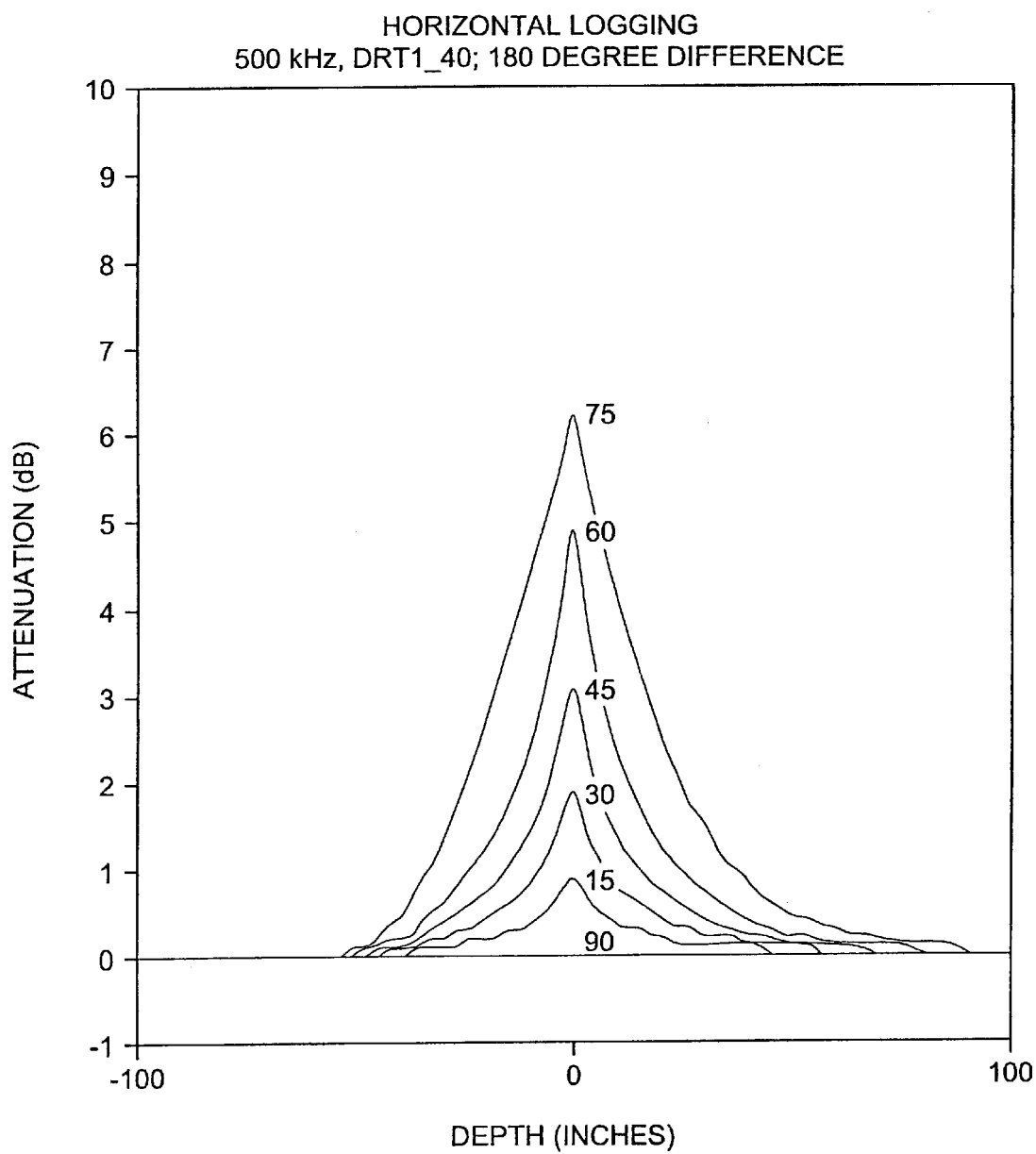
FIG. 17 is a graph of the theoretical 180 degree amplitude attenuation observed near a bed boundary for a second azimuthally sensitive resistivity tool embodiment.

FIG. 17 shows the amplitude of $S(R_1,T_L)$ relative to $S(R_{180},T_L)$ as a function of distance from a bed boundary, with the same conditions as before. Here it is again observed that the coils skewed at larger angles exhibit the greatest sensitivity to the boundary, but signal power considerations may limit the skew angles to about 60° or less.

Another alternative tool embodiment similar to FIG. 9, but having a set of skewed transmitter coils and only unskewed receiver coils may also be useful for providing an azimuthally sensitive resistivity tool. Synthesis equations for virtual response signals $S(T_T,R_L)$ and $S(T_Z,R_L)$ can be derived and used to determine the azimuthal direction of bed boundaries.

An azimuthally tunable resistivity tool has been disclosed. This tool can be used to detect the presence of an adjacent bed and to estimate its proximity by measuring formation resistivity azimuthally. For example, FIG. 5 shows a borehole in a sand layer below a more conductive shale bed. The apparent resistivity measured upward is lower than the resistivity measured downward. The difference between the upward and downward resistivity measurements can be used to detect the adjacent conductive bed and estimate the distance to the bed interface. The azimuthal direction of the minimum and maximum measured resistivities can then be used to determine the direction of the bed interface.

While the present invention has been described and disclosed in terms of a preferred embodiment, it will be understood that variations in the details thereof can be made without departing from the scope of the invention.

What is claimed is:

1. An azimuthally tunable resistivity tool for use in a borehole having a borehole axis, wherein the tool comprises:
    at least one transmitter antenna configured to transmit a radio-frequency signal; and
    at least three receiver antennas configured to receive the radio-frequency signal, wherein the receiver antennas are each oriented at a skew angle from the borehole axis, and wherein the receiver antennas are oriented in differing azimuthal directions.

2. The tool of claim 1, wherein the receiver antennas are oriented in evenly spaced azimuthal directions from a tool axis.

3. The tool of claim 1, wherein the receiver antennas share a common skew angle.

4. The tool of claim 3, wherein the common skew angle is between 45° and 60°, inclusive.

5. The tool of claim 3, wherein the common skew angle is substantially equal to $\mathrm{accross}(3^{-1/2})$, and the receiver antennas are orthogonal to each other.

6. The tool of claim 1, wherein the transmitter and receiver antennas are wire coils.

7. The tool of claim 6, wherein the transmitter antenna comprises a single wire loop.

8. The tool of claim 1, wherein signals from the receiver antennas are combined to synthesize received signals from one or more virtual receivers.

9. The tool of claim 8, wherein the one or more virtual receivers includes a virtual receiver oriented with a skew angle of 0°.

10. The tool of claim 8, wherein the one or more virtual receivers includes a virtual receiver oriented with a skew angle of 90°.

11. The tool of claim 8, wherein the one or more virtual receivers includes a virtual receiver oriented with an azimuthal direction different than any of the at least three receiver antennas.

12. The tool of claim 1, further comprising:
    a reference receiver antenna oriented with a skew angle of 0°, wherein signals from the reference receiver antenna are used to determine a phase difference and relative attenuation of signals from the at least three receiver antennas.

13. The tool of claim 1, further comprising:
    at least three transmitter antennas configured to transmit a radio frequency signal, wherein the at least three transmitter antennas are each oriented at a skew angle from the borehole axis, and wherein the at least three transmitter antennas are oriented in differing azimuthal directions.

14. An azimuthally tunable resistivity tool for use in a borehole having a borehole axis, wherein the tool comprises:
    at least three transmitter antennas configured to transmit a radio frequency signal, wherein the transmitter antennas are each oriented at a skew angle from the borehole axis, and wherein the transmitter antennas are oriented in differing azimuthal directions; and
    at least one receiver antenna configured to receive the radio-frequency signal.

15. The tool of claim 14, wherein the transmitter antennas are oriented in evenly spaced azimuthal directions from a tool axis.

16. The tool of claim 14, wherein the transmitter antennas share a common skew angle.

17. The tool of claim 16, wherein the common skew angle is between 45° and 60°, inclusive.

18. The tool of claim 16, wherein the transmitter antennas are substantially orthogonal to each other.

19. The tool of claim 14, wherein the transmitter and receiver antennas are wire coils.

20. The tool of claim 14, wherein signals from the receiver antenna in response to each of the transmitter antennas are combined to synthesize received signals from one or more virtual transmitter antennas.

21. The tool of claim 20, wherein the one or more virtual transmitter antennas includes a virtual transmitter antenna oriented with a skew angle of 0°.

22. The tool of claim 20, wherein the one or more virtual transmitter antennas includes a virtual transmitter antenna oriented with a skew angle of 90°.

23. The tool of claim 20, wherein the one or more virtual transmitter antennas includes a virtual transmitter antenna oriented with an azimuthal direction different than any of the at least three transmitter antennas.

24. The tool of claim 14, further comprising:
a reference receiver antenna oriented with a skew angle of 0°, wherein signals from the reference receiver antenna are used to determine a phase difference and relative attenuation of signals from the at least one receiver antenna.

25. A method for detecting the location of a bed boundary relative to a borehole, wherein the method comprises:
generating a first signal representing a first azimuthally sensitive measurement of phase shift and attenuation of an electromagnetic signal propagating through a formation around a borehole;
generating a second signal representing a second azimuthally sensitive measurement of phase shift and attenuation of an electromagnetic signal propagating through the formation around a borehole, wherein the azimuthal sensitivity of the first measurement is in a direction different than that of the second measurement; and
determining a virtual antenna orientation having a maximized signal amplitude synthesized from the first and second signals.

26. The method of claim 25, wherein the generating of the first and second signals includes:
receiving electromagnetic signals transmitted from first and second skewed transmitter antennas respectively oriented in first and second azimuthal directions.

27. The method of claim 25, wherein the generating of the first and second signals includes:
receiving a transmitted electromagnetic signal on first and second skewed receiver antennas respectively oriented in first and second azimuthal directions.

28. The method of claim 25, further comprising:
using the maximized signal amplitude to estimate a distance to the bed boundary.

29. The method of claim 25, further comprising:
combining the first and second signals to obtain an azimuthally-insensitive measurement of phase shift and attenuation;
estimating a distance to the bed boundary from the azimuthally-insensitive measurement.

30. A method for performing azimuthally tunable resistivity measurements, wherein the method comprises:
transmitting an electromagnetic signal which propagates through a formation surrounding a borehole;
measuring one or more characteristics of the electromagnetic signal using three skewed receiver antennas, wherein the skewed receiver antennas are oriented in equally spaced azimuthal directions;
combining the skewed receiver measurements to form a desired virtual receiver measurement, wherein the desired virtual receiver has a desired skew angle and a desired azimuthal direction.

31. The method of claim 30, wherein said characteristics include a phase shift.

32. The method of claim 30, wherein said characteristics include an attenuation.

33. A method for performing azimuthally tunable resistivity measurements, wherein the method comprises:
using three skewed transmitter antennas oriented in equally spaced azimuthal directions to transmit electromagnetic signals which propagate through a formation surrounding a borehole;
using a receiver antenna to measure one or more characteristics of the electromagnetic signals;
combining the measurements to form a receiver measurement of characteristics of electromagnetic signals transmitted by a desired virtual transmitter, wherein the desired virtual transmitter has a desired skew angle and a desired azimuthal direction.

34. The method of claim 33, wherein said characteristics include a phase shift.

35. The method of claim 33, wherein said characteristics include an attenuation.

* * * * *